(12) United States Patent
Anderson

(10) Patent No.: US 7,991,866 B2
(45) Date of Patent: Aug. 2, 2011

(54) SYSTEMS AND METHODS FOR UPDATING A SITE

(75) Inventor: Casey Anderson, Taylorsville, UT (US)

(73) Assignee: Control4 Corporation, Salt Lake City, UT (US)

( * ) Notice: Subject to any disclaimer, the term of this patent is extended or adjusted under 35 U.S.C. 154(b) by 285 days.

(21) Appl. No.: 11/465,739

(22) Filed: Aug. 18, 2006

(65) Prior Publication Data

US 2008/0046878 A1 Feb. 21, 2008

(51) Int. Cl.
*G06F 15/173* (2006.01)
*G06F 9/44* (2006.01)

(52) U.S. Cl. ........................................ 709/223; 717/168

(58) Field of Classification Search ................... 709/219, 709/223, 224; 717/168–172
See application file for complete search history.

(56) References Cited

U.S. PATENT DOCUMENTS

| | | | |
|---|---|---|---|
| 6,912,429 B1 | 6/2005 | Bilger | |
| 7,161,483 B2 * | 1/2007 | Chung | 340/531 |
| 2005/0080879 A1 * | 4/2005 | Kim et al. | 709/219 |
| 2005/0246408 A1 | 11/2005 | Chung | |
| 2006/0031828 A1 * | 2/2006 | Won et al. | 717/168 |
| 2006/0037013 A1 * | 2/2006 | Kang | 717/168 |
| 2007/0169090 A1 * | 7/2007 | Kang | 717/168 |
| 2008/0077913 A1 * | 3/2008 | Ahn et al. | 717/170 |

OTHER PUBLICATIONS

"Home Automated Living: Downloads," http://www.automatedliving.com/downloads.shtml, Jun. 7, 2006.
"HomeSeer Global Caché Plug-In," http://www.smarthome.com/12667.html, pp. 1-2, Jun. 7, 2006.
"ProSyst Software AG for a smarter world," http://www.ictsb.org/Smart%20Houses/Documents/Annex_WS-Present_9.pdf, pp. 1-3, Jun. 7, 2006.
"RCS Model CS308, Network Control Unit with Built-in 8 Channel RS485 Hub," http://www.resconsys.com/docs/controllers/cs30/CS308%20PB%20rev02%202-02.pdf, Jun. 7, 2006.
"Programs for Computer interfaces," http://www.smarthome.com/solution34.html, pp. 1-4, Jun. 7, 2006.

* cited by examiner

*Primary Examiner* — Yemane Mesfin
(74) *Attorney, Agent, or Firm* — Austin Rapp & Hardman

(57) ABSTRACT

A method for updating a site is disclosed. A site controller may be provided. A plurality of devices that are not directly user updatable may be provided. The plurality of devices may be in electronic communication with the site controller. External media may be provided. The external media may include device software updates. The external media may be in electronic communication with the site controller. The method may automatically determine which devices of the plurality of devices need to be updated. The method may automatically update the devices needing an update by communicating at least a portion of the device software update to the devices needing an update.

27 Claims, 11 Drawing Sheets

SYSTEMS AND METHODS FOR UPDATING A SITE

TECHNICAL FIELD

The present invention relates generally to computers and computer-related technology. More specifically, the present invention relates to systems and methods for updating a site.

BACKGROUND

The price of electronic devices has continued to decrease dramatically. In addition, the types of consumer electronic components and home automation electronics that can be purchased have continued to increase. For example, DVD players, large screen TVs, multi-carousel CD and DVD players, MP3 players, video game consoles, and similar consumer electronic items have continued to drop in price and become more widely available. The decreasing prices and increasing types of consumer electronic components has packed today's homes with modern conveniences. But as these conveniences grow in number and sophistication, they also become more difficult to manage and control. In recent years, home automation systems have emerged to help manage and control the myriad devices found in modern homes.

While the home automation market continues to grow each year, past solutions typically addressed customers who build high-end custom homes or do major reconstructions on an existing home. Homeowners have needed a more affordable way to automate their existing homes without the headaches and expense of major remodeling. Additionally, homeowners wanted to be able to add new products over time as they are able to afford additional technology. Home automation companies have answered the call by utilizing new wireless technologies that have significantly reduced the costs of installing automated devices in older homes as well as newly constructed homes. The desire for control of devices at a particular location is continuing to expand into retail and other non-home markets.

However, with the affordability of new technology, the number of automated devices in modern homes and other sites has continued to steadily increase. Property owners now desire more customizable systems and features in their automation systems. New customizations and features in existing systems require updates. With the increasing quantity of automation devices to be updated and the pressure for customization and new features, updating a site has become a cumbersome process. Presently each device is typically updated by a user, device by device. Therefore, what are needed are systems and methods for automatically updating a site.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
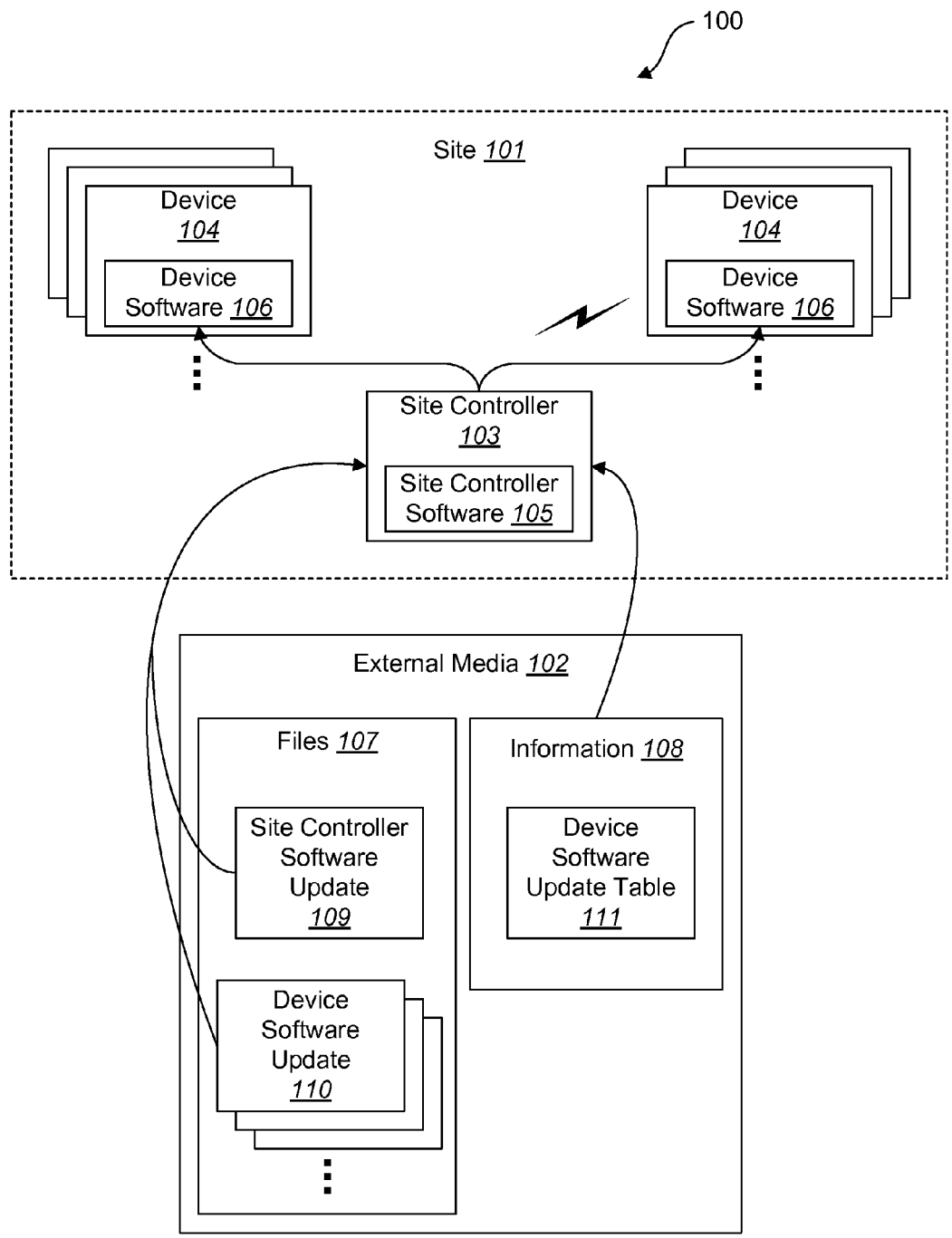
FIG. 1 is a block diagram illustrating a system for updating a site.

A method for updating a site is disclosed. A site controller is provided. A plurality of devices that are not directly user updatable are provided. The plurality of devices are in electronic communication with the site controller. External media includes device software updates. The external media is put in electronic communication with the site controller. Which devices of the plurality of devices that need to be updated is automatically determined. The devices needing an update are automatically updated by communicating at least a portion of the device software update to the devices needing an update.

A computer system that is configured to update a site with a site controller is disclosed. The computer system includes a plurality of devices that are not directly user updatable. The plurality of devices are in electronic communication with the site controller. The computer system also includes external media that is in electronic communication with the site controller. The external media includes device software updates. The site controller includes a processor. The site controller also includes memory that is in electronic communication with the processor. The site controller includes instructions that are stored in the memory. The instructions are executable to perform various functions. The site controller automatically determines which devices of the plurality of devices need to be updated. The site controller automatically updates the devices needing an update by communicating at least a portion of the device software update to the devices needing an update.

A computer-readable medium is disclosed. The computer readable medium includes executable instructions for implementing a method for updating a site. The site includes a site controller. The site also includes a plurality of devices that are not directly user updatable. The plurality of devices is in electronic communication with the site controller. The site includes external media in electronic communication with the site controller. The external media includes device software updates. The site controller automatically determines which devices of the plurality of devices need to be updated. The site controller also automatically updates the devices needing an update by communicating at least a portion of the device software update to the devices needing an update.

In some embodiments, a current software version of a first device is automatically stored. In further embodiments, the device software updates are automatically stored on the site controller from the external media.

In some embodiments, automatically determining which devices of the plurality of devices that need to be updated does not require any user interaction at the site controller. In other embodiments, automatically updating the devices needing an update does not require any user interaction at the site controller.

In some embodiments, the site controller does not require a keyboard or a mouse for standard operation. In further embodiments, the site controller comprises an embedded system that includes built-in audio ports, built-in video ports, and built-in infrared in and out ports. In still further embodiments, the site controller does not require an external exclusive computer monitor for standard operation.

In some embodiments, the external media is in electronic communication with the site controller via a network. In further embodiments, the network is the Internet. In other embodiments, the site controller is not connected to the Internet.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 is a block diagram illustrating a system 100 for updating a site 101. The system 100 may include a site 101 and external media 102. The site 101 may include a site controller 103 and various devices 104. The site controller may include site controller software 105. The site controller software 105 may be used to control the various devices 104 in the site 101.

The site controller 103 may be in electronic communication with the devices 104. The devices 104 may communicate with the site controller 103 using a wired or wireless network. For example, the devices 104 may communicate with the site controller 103 via an Ethernet connection, a wireless connection using the 802.11g (WiFi) standard, a wireless connection using the 802.15.4 (ZigBee) standard, or other wired or wireless connections.

The devices 104 may include device software 106. The device software 106 may interact with the site controller software 105 to control the function of the various devices 104. The site controller software 105 may be used to update the device software 106 on the connected devices 104. In most embodiments, the devices 104 are not capable of being directly updated by a user; rather, the devices 104 must be updated by the site controller 103.

For example, a device 104 that is not directly user updatable may not have a communication port for putting the external media 102 in electronic communication with the device 104 and may not have a connection to a network outside of the control of the site controller 103. In some embodiments, some of the devices do not have memory or software that can be updated. Devices 104 that are not capable of being updated may include speakers, fireplaces, and other lower technology devices. If non-updatable devices become capable of being updated, these updatable devices would be within the scope of this description. For the purposes of this disclosure, the term "device" refers to devices that are updatable, but not directly updateable by a user. For example, the term "device" may refer to a device that does not have a communication port for putting the external media 102 in communication with the device. The term "device" may also refer to a device that does not have a connection to a network outside of the control of the site controller 103. The "device" may have memory or software that is updateable.

The external media 102 may be in electronic communication with the site controller 103. Electronic communication may include a network connection. For example, the external media 102 may be an external hard drive that is connected to the site controller over the Internet. The external media 102 may take the form of memory cards such as the CompactFlash, SmartMedia, Memory Stick, Secure Digital, MultiMedia card, or xD-Picture Card formats; a CD-ROM, DVD-ROM, floppy disks, or external hard drive; or a USB flash drive. The external media 102 may include files 107 and information 108. The files may include a site controller software update 109 and various device software updates 110. The information 108 may include a device software update table 111.

Figure 2:
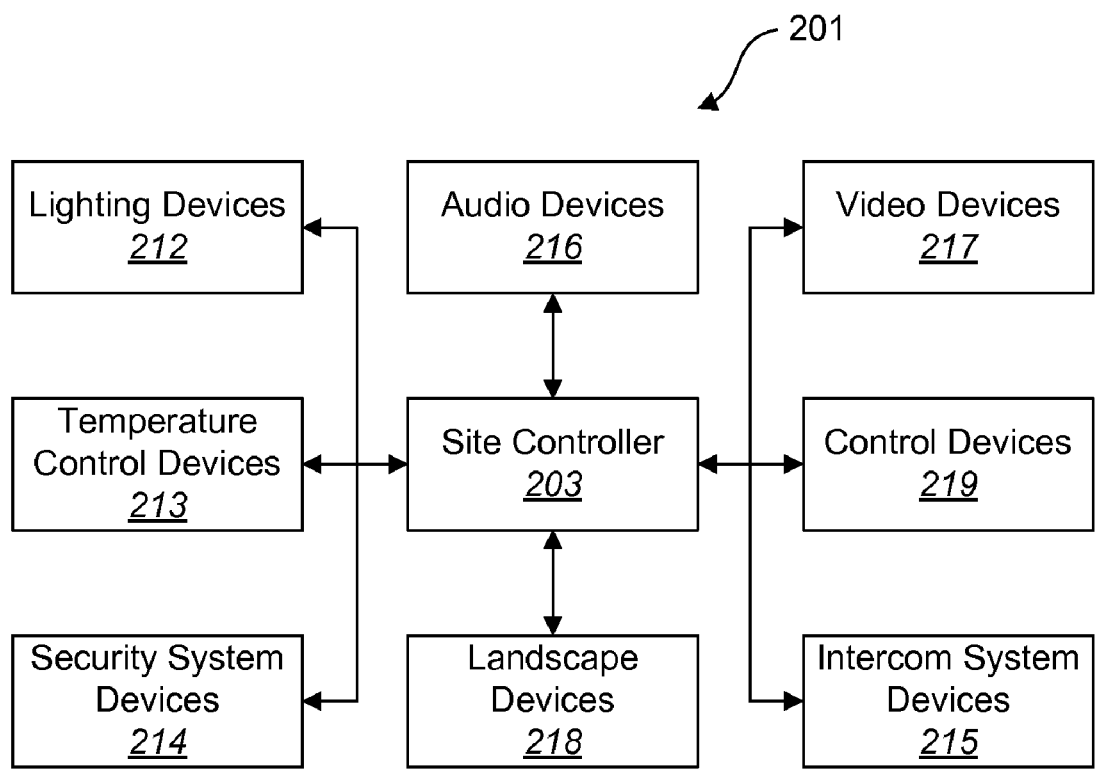
FIG. 2 is a block diagram illustrating an embodiment of a site to be updated.

FIG. 2 is a block diagram illustrating an embodiment of a site 201 to be updated. The site 201, in the present embodiment, includes a site controller 203. The site controller 203 is in electronic communication with various devices 104. A site 201 may include multiple site controllers 103, but typically requires that one of the site controllers 103 is designated as the primary site controller 203. The devices 104, in the present embodiment, may include lighting devices 212, temperature control devices 213, security system devices 214, intercom system devices 215, audio devices 216, video devices 217, landscape devices 218, and control devices 219. Lighting devices 212 may include light switches, dimmers, window blinds, etc. Temperature control devices 213 may include thermostats, fans, fireplaces, and the like. Security system devices 214 may include security cameras, motion detectors, door sensors, window sensors, gates, or other security devices. Intercom system devices 215 may include intercom microphones, intercom related video devices, and other devices typically associated with an intercom system. Audio devices 216 may include AM/FM radio receivers, XM radio receivers, CD players, MP3 players, cassette tape players, and other devices 104 capable of producing an audio signal. Video devices 217 may include televisions, monitors, projectors, and other devices 104 capable of producing a video signal. Landscape devices 218 may include sprinkler system devices, drip system devices, and other landscape related devices. In the present embodiment, the control devices 219 may include touch screens, keypads, and remote controls. Other control devices 219 may also be used.

Figure 3:
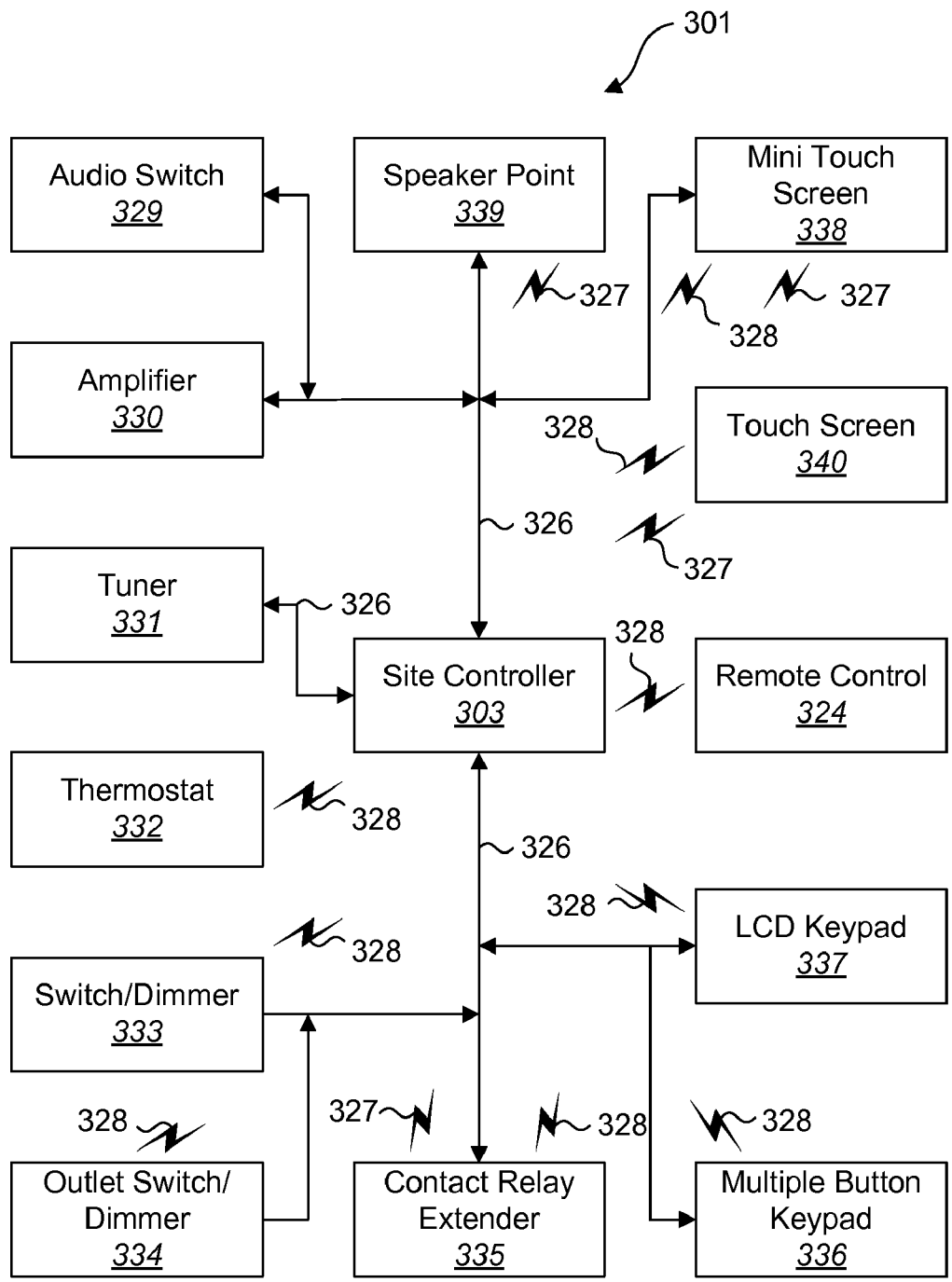
FIG. 3 is a block diagram illustrating the connections between the devices and a site controller according to another embodiment of a site to be updated.

FIG. 3 is a block diagram illustrating the connections between the devices 104 and a site controller 303 according to another embodiment of a site 301 to be updated. The site controller 303 may be connected to the devices 104 via wireless or wired connections. In the present embodiment, the site controller 303 may be connected to the devices 104 via an Ethernet connection 326, a WiFi connection 327, a ZigBee connection 328, or a combination of the three. The site controller 303 may be capable of communicating via these network connections, i.e. Ethernet, WiFi, or ZigBee connections 326, 327, 328 or other connections. The site controller 303 and/or the devices 104 in the site 301 may not have access to the Internet.

In the present embodiment, an audio switch 329, amplifier 330, and tuner 331 may be connected to the site controller 303 via Ethernet connections 326. The remote control 324 and a thermostat 332 may be connected to the site controller 303 via ZigBee connections 328. A switch/dimmer 333, outlet switch/dimmer 334, multiple button keypad 336, and LCD keypad 337 may be connected to the site controller 303 via Ethernet connections 326 and ZigBee connections 328. A mini touch screen 338 and a contact relay extender 335 may be connected to the site controller 303 via an Ethernet connection 326, a ZigBee connection 328, and a WiFi connection 327. A speaker point 339 may be connected to the site controller 303 via an Ethernet connection 326 and a WiFi connection 327. A touch screen 340 may be connected to the site controller 303 via a ZigBee connection 328 and a WiFi connection 327.

Figure 4:
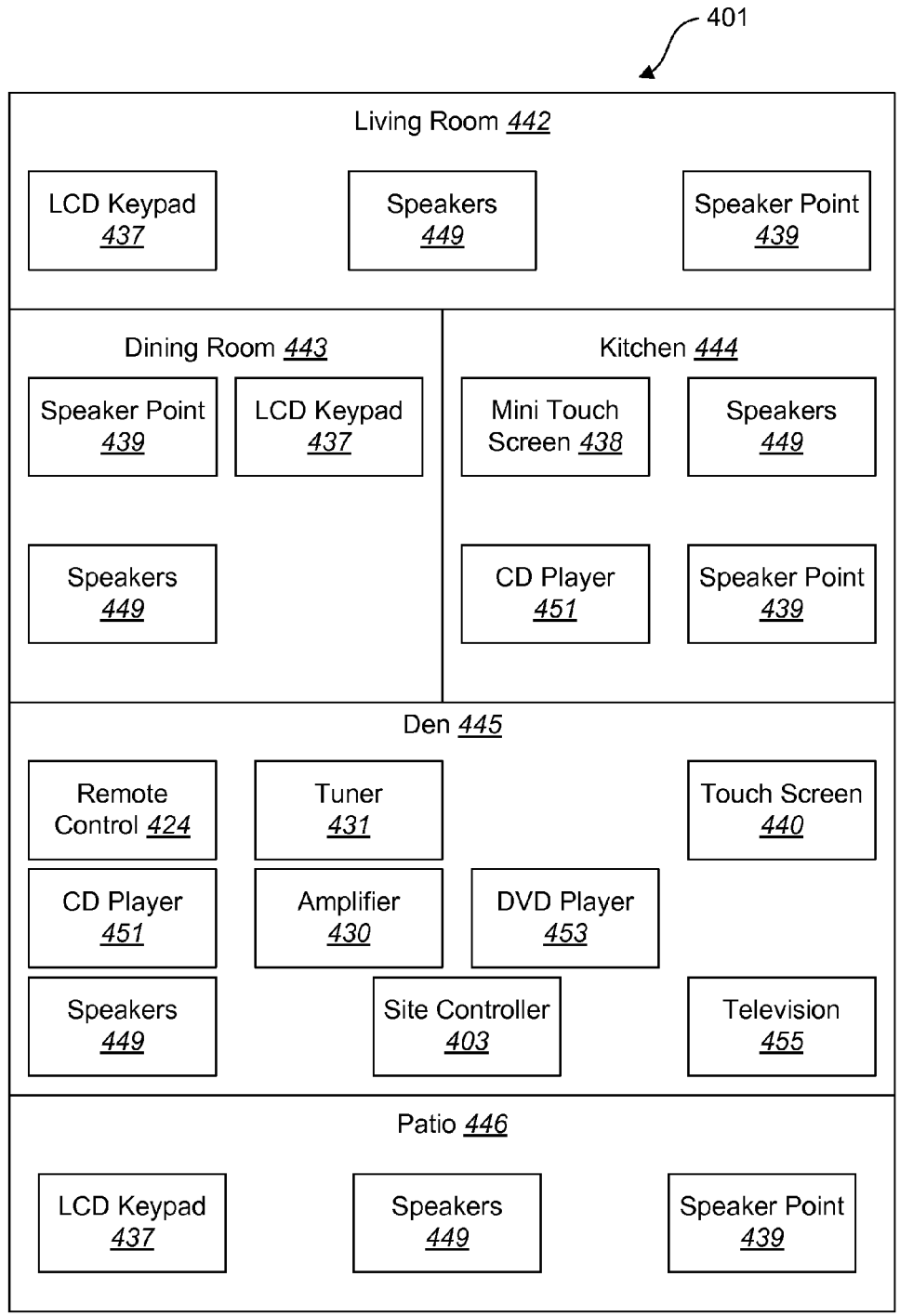
FIG. 4 is a block diagram illustrating an exemplary audio/visual home automation site in which the present systems and methods may be implemented.

FIG. 4 is a block diagram illustrating an exemplary audio/visual home automation site 401 in which the present systems and methods may be implemented. The audio/visual home automation site 401 may include various areas, such as a living room 442, dining room 443, kitchen 444, den 445, and a patio 446. Though the present embodiment illustrates a home automation site 401, other sites 101 may also implement the present systems and methods. For example, the present systems and methods may be implemented in an office building, warehouse, or other site 101. A site 101 may not be limited to a particular building or space. Rather, a site 101 may include a site controller 103 and various devices 104 in electronic communication with the site controller 103. A home, for example, may include more than one site 401. In some embodiments, multiple site controllers 103 may be used within the same site, though one site controller 103 is typically designated as the primary site controller 103.

Other devices 104, other than the devices 104 shown in FIG. 4, such as security system devices 214, intercom system devices 215, temperature control devices 213, etc., may also be used in the present embodiment of a site 401. However, for ease of presentation, only audio devices 216, video devices 217, touch screens 340, remote controls 424, and LCD keypads 437 are shown in FIG. 4. In the present embodiment, the audio devices 216 include amplifiers 430, tuners 431, speakers 449, speaker points 439, and CD players 451. The video devices 217, in the present embodiment, may include DVD players 453 and televisions 455. Other audio devices 216 and video devices 217 may be used in the present systems and methods, such as MP3 players, digital video recorders, satellite boxes, cable boxes, video game systems, etc.

The site controller 403, in the present embodiment of a site 401, may be located in the den 445. The site controller 403 may be in electronic communication with various devices 104. The various devices 104 shown in FIG. 4 may be in electronic communication with the site controller 403 using the connections, i.e. Ethernet, WiFi, or ZigBee connections 326, 327, 328 described in connection with the site 401 of FIG. 3, or may use other types of connections. In the present embodiment, the den 445 may include the site controller 403, a CD player 451, a DVD player 453, an amplifier 430, a tuner 431, a television 455, and speakers 449. The speakers 449 in the den 445 may be connected directly to the site controller 403. A remote control 424 and a touch screen 440 may also be located in the den 445.

In the present embodiment, speakers 449 that are not directly connected to the site controller 403, such as the speakers 449 in the living room 442, dining room 443, and kitchen 444 and the speakers 449 on the patio 446, may be connected to one of the speaker points 439. The speaker points 439 may allow the speakers 449 not directly connected to the site controller 403 to be controlled by the site controller 403. For example, the site controller 403 may transmit audio signals to the speakers 449 via the speaker points 439. The audio signals, in the present embodiment, may be transmitted to the speaker points 439 over an Ethernet connection 326 or a WiFi connection 327. However, any connection capable of the bandwidth necessary to transmit audio signals may be used. Similar connections may be used for transmitting video signals over a site 401.

The remote control 424 and touch screen 440 in the den 445, the LCD keypads 437 located in the living room 442, dining room 443, and on the patio 446, and the mini touch screen 438 located in the kitchen 444 may be used to control all of the devices 104 in the site 401 that are connected to the site controller 403. For example, the LCD keypad 437 in the living room 442 may control the CD player 451 in the den 445 to play music over the speakers 449 in the living room 442 via the speaker point 439 in the living room 442. The LCD keypad 437 in the living room 442 may also, for example, control the CD player 451 in the den 445 to play music over all speakers 449 in the site 401 via their respective speaker points 439 or a direct connection to the site controller 403.

Figure 5:
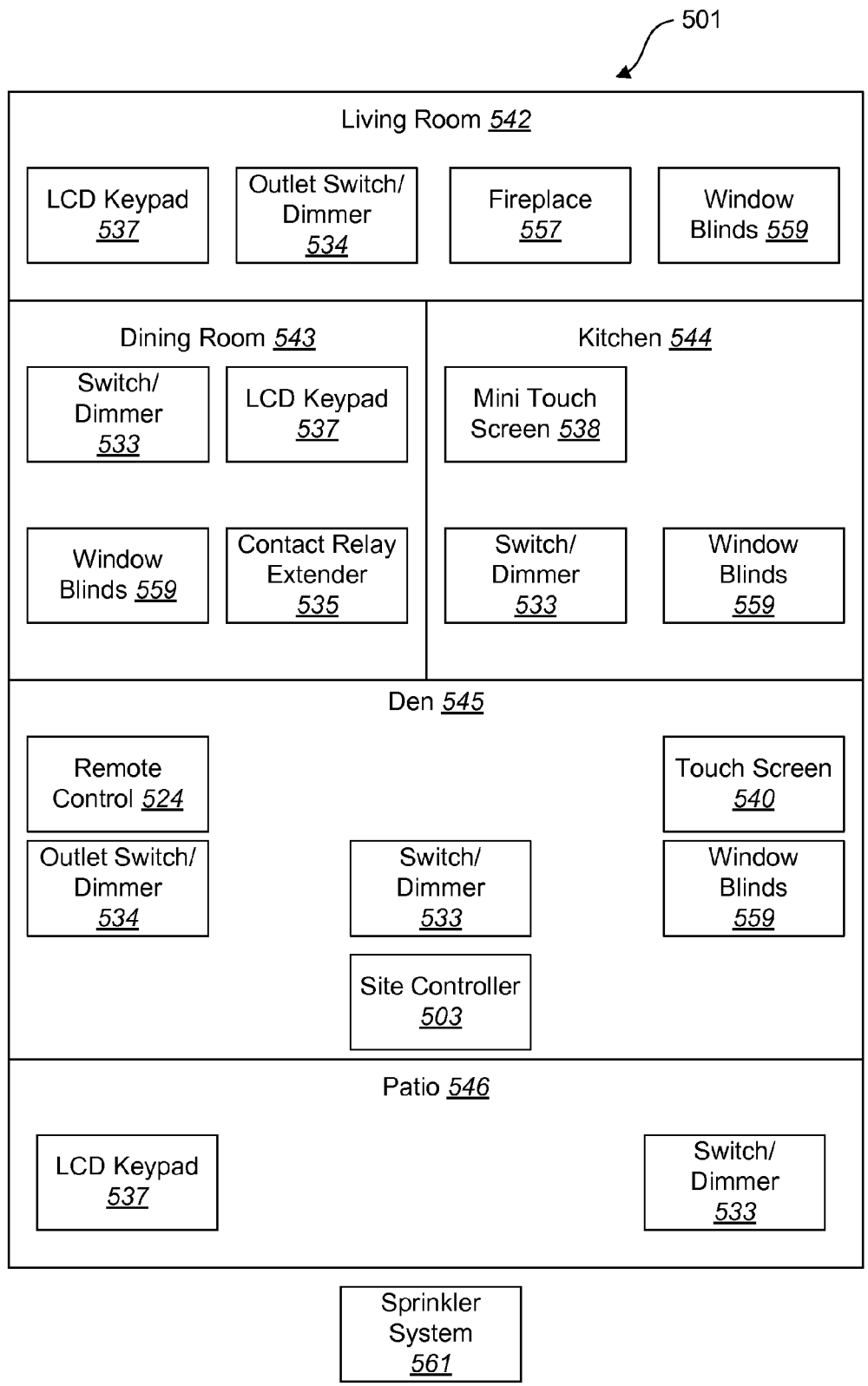
FIG. 5 is a block diagram illustrating another exemplary home automation site in which the present systems and methods may be implemented.

FIG. 5 is a block diagram illustrating another exemplary home automation site 501 in which the present systems and methods may be implemented. The present exemplary home automation site 501 may include various areas, such as a living room 542, dining room 543, kitchen 544, den 545, and patio 546.

As with the audio/visual exemplary home automation site 401, though the present embodiment illustrates a home automation site 501, other sites 101 may also implement the present systems and methods. Also, as with the audio/visual exemplary home automation site 401, other devices 104, other than the devices 104 shown in FIG. 5, such as security system devices 214, intercom system devices 215, temperature control devices 213, etc., may also be used in the present embodiment of a site 501. However, for ease of presentation, only lighting devices 212, landscape devices 218, touch screens 340, remote controls 524, and LCD keypads 537 are shown.

In the present embodiment, the lighting devices 212 may include switch/dimmers 533, outlet switch/dimmers 534, fireplaces 557, and window blinds 559. The landscape devices 218, in the present embodiment, may include a sprinkler system 561. Other lighting devices 212 and landscape devices 218 may also be used with the present systems and methods.

As with the previous embodiment, the site controller 503, in the present embodiment of a site 501, may be located in the den 545. The site controller 503 may be in electronic communication with various devices 104. The various devices 104 shown in FIG. 5 may be in electronic communication with the site controller 503 using the connections, i.e. Ethernet, WiFi, or ZigBee connections 326, 327, 328 described in connection with the site 301 of FIG. 3, or may use other types of connections. In the present embodiment, the den 545 may include the site controller 503, a switch/dimmer 533, an outlet switch/dimmer 534, and window blinds 559. The remote control 524 and touch screen 540 may be located in the den 545.

The remote control 524 and touch screen 540 in the den 545, the LCD keypads 537 located in the living room 542, dining room 543, and on the patio 546, and the mini touch screen 538 located in the kitchen 544 may be used to control all of the devices 104 in the site 501 that are connected to the site controller 503, as with the devices 104 described in connection with the site 401 shown in FIG. 4.

Typically devices like window blinds 559, the fireplace 557 or the sprinkler system 561 may not be capable of communication using an Ethernet, WiFi, or ZigBee connection 326, 327, 328. In order to control such devices, the contacts, relays, or other connections that control their function are connected to a device 104 that is capable of communication with the site controller 503.

For example, the window blinds 559 in the dining room 543 may be connected to a contact relay extender 535. The contact relay extender 535 may then communicate with the site controller 503 using an Ethernet connection 326, a WiFi connection 327, or a ZigBee connection 328. The site controller 503 may then be programmed to raise, lower, or adjust the blinds 559. If a user wanted to lower the blinds 559 in the dining room 543, the user may use the LCD keypad 537 to send a signal to the site controller 503, which would send a signal to the contact relay extender 535, which would send a signal to the servo of the window blinds 559 to lower the blinds. The sprinkler system 561 may be connected to the site controller 503 in a similar fashion.

Figure 6:
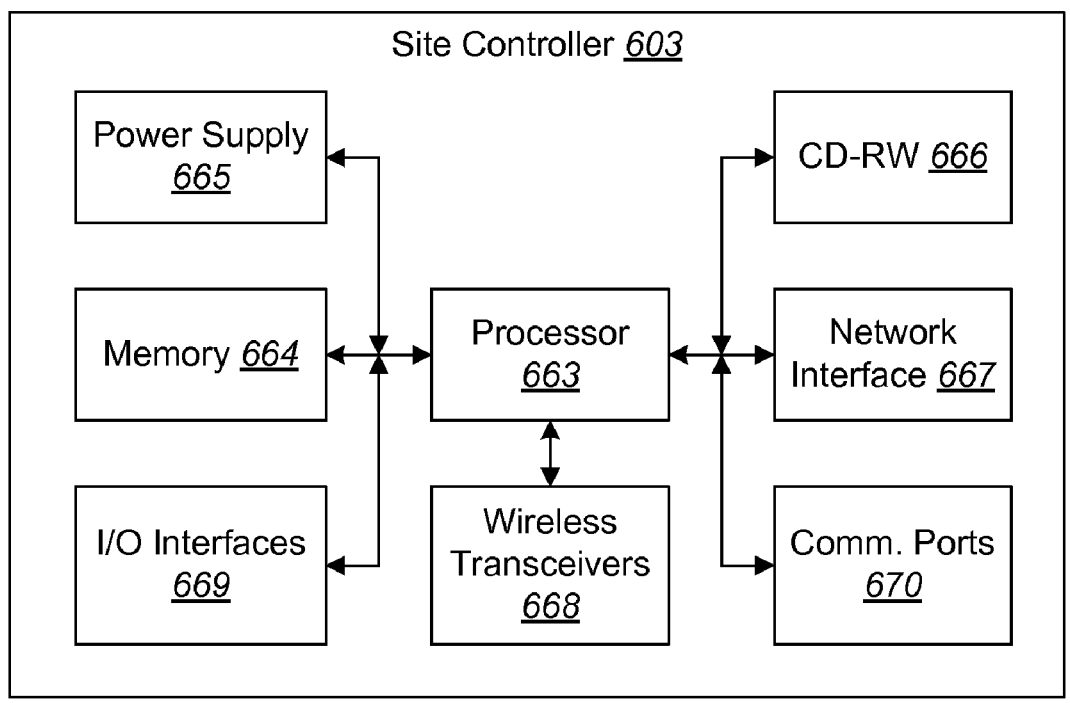
FIG. 6 is a block diagram illustrating various hardware components that may be used in an embodiment of a site controller that may be utilized during a site update.

FIG. 6 is a block diagram illustrating various hardware components that may be used in an embodiment of the site controller 603 that may be utilized during an update of a site 101. The site controller 603 may include a processor 663 that is in electronic communication with memory 664. The memory 664 may include volatile and/or non-volatile memory. The site controller 603 may include a power supply 665. The site controller 603 may include a CD-RW drive 666. In other embodiments, the CD-RW drive 666 may not be a writeable drive, but may only be a CD-ROM drive. In still other embodiments, the CD-RW drive 666 may be a DVD-RW or a DVD-ROM drive. The CD-RW drive 666 may also be a Blu-ray disk or a HD DVD drive. The site controller 603 may be capable of using the CD-RW drive 666 to rip audio or video data from CDs and DVDs.

The site controller 603 may include a network interface 667 that allows the site controller 603 to connect to wired connections, such as Ethernet connections 326. The network interface 667 may use various protocols to enable the site controller 603 to interface with any wired network. The site controller 603 may include wireless transceivers 668. In the present embodiment, the site controller 603 may include a WiFi transceiver and a ZigBee transceiver. The site controller 603 may include any type of wireless transceiver 668. For example, the wireless transceiver 668 may allow the site controller 603 to transmit and receive data using any wireless protocol, such as WiFi, ZigBee, Bluetooth, Ultra Wideband, Wimax, or cellular protocols, such as GSM or EVDO.

The site controller 603 may include I/O interfaces 669. For example, the I/O interfaces 669 may include inputs and/or outputs such as contacts and relays. The site controller 603 may include communication ports 670. The communication ports 670 may include USB ports, firewire ports, or other ports for communicating with other devices.

Figure 7:
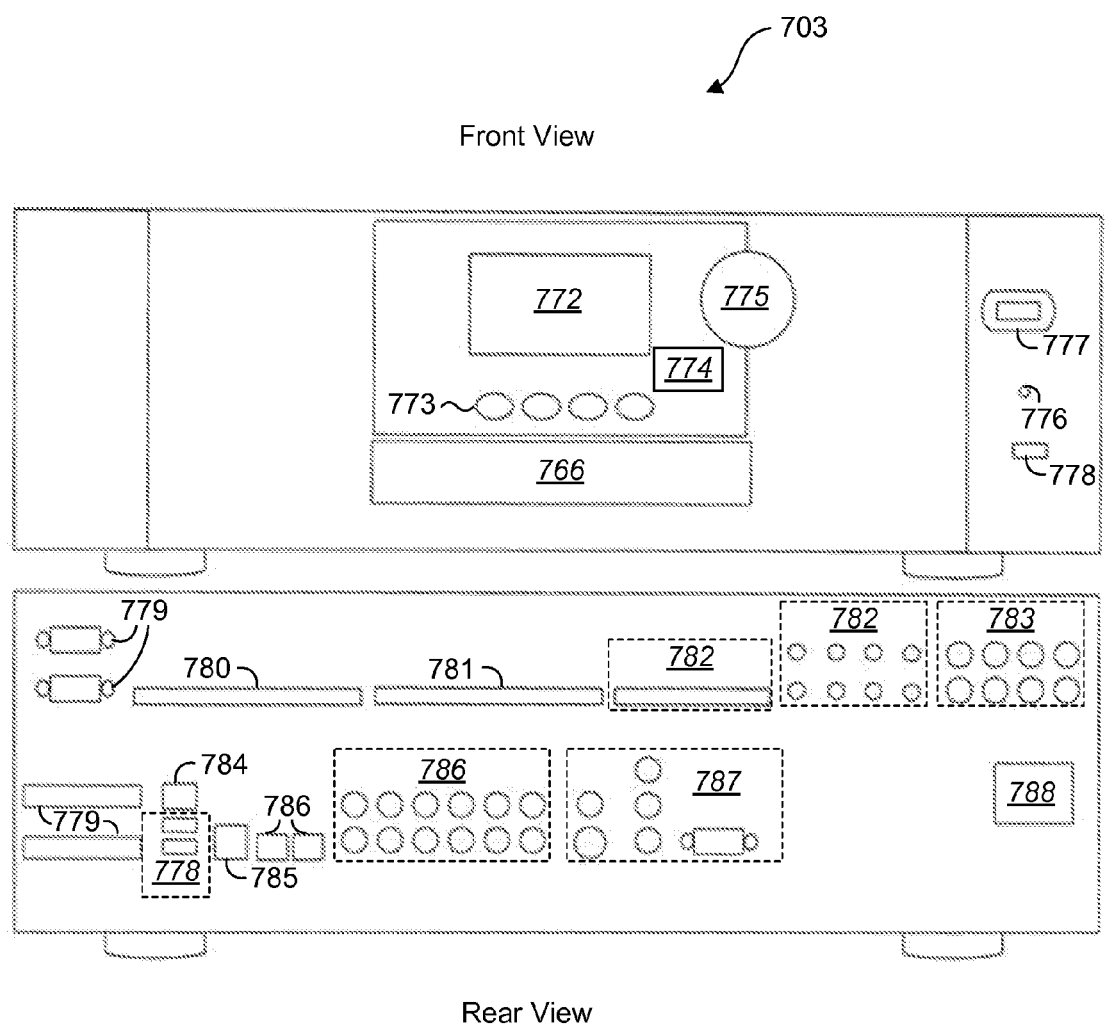
FIG. 7 is a block diagram illustrating the various features available on an exemplary site controller.

FIG. 7 is a block diagram illustrating the various features available on an exemplary site controller 703. Specifically, FIG. 7 shows the front and back of an exemplary site controller 703. Most connectors and ports are typically found on the back of the site controller 703 leaving the front more aesthetically pleasing. However, the location of the various connectors and ports is typically not functionally important.

The site controller 703 may include a display area 772. The display area 772 in the present embodiment may be used to display settings, playlist sections, title sections, media information, receiver status, and system menus. The site controller 703 may also include various buttons 773 for selecting options displayed in the display area 772.

The site controller 703 may also include an infrared (IR) in window 774. The IR in window 774 may be used to receive IR codes from the remote control 324 or from any other IR device, including other remote controls (not shown) used to control devices that are not capable of communication with the site controller 703. The IR in window 774 may also be used to capture IR codes that other $3^{rd}$ party remote controls use to control the equipment the remote is intended to control. This may make the $3^{rd}$ party remote controls unnecessary for the control of the devices 104 connected to the site controller 703. The site controller 703 may include a selection dial 775. The selection dial 775 may be used to scroll through menus and media lists displayed in the display area 772.

In the present embodiment, the site controller 703 may include a reset button 776. The reset button 776 may be used to refresh the site controller software 105. The site controller 703 may also include a WiFi antenna 777. The WiFi antenna 777 may be used with an extender (not shown) to improve reception of wireless signals. A ZigBee antenna (not shown) may also be used to allow the device to communicate over an independent wireless network using a ZigBee connection 328.

The site controller 703 may also include a CD-RW drive 766. As discussed above, the CD-RW drive 766 may be replaced with any drive that is capable of playing CD or DVD related media. The CD-RW drive 766 may be used to import CD or DVD data into the memory 664 of the site controller 703. The site controller 703 may also include a USB port 778. The USB port 778 may be used to import data from USB enabled devices. For example, the CD-RW drive 766 and/or the USB port 778 may be used to transfer update data from external media 102 to the site controller 703.

The site controller 703 may include serial ports 779. The serial ports 779 may include standard serial ports and configurable serial ports. The standard serial ports may be used for RS-232 or other I/O devices, which include hardware flow control. In the present embodiment, the site controller 703 may include two standard serial ports. The configurable serial ports may be used for RS-232, RS-422, or RS-485 devices or for other serial I/O devices. In the present embodiment, the site controller 703 may include two configurable serial ports.

The site controller 703 may include contact ports 780. The contact ports 780 may include a pluggable terminal block connector that may be used for dry contact closure, or logic input connections, such as door switches or motion sensors. In the present embodiment, the site controller 703 may include six contact ports 780. The site controller 703 may include relay ports 781. The relay ports 781 may include a pluggable terminal block connector that may be used for normally closed or normally opened switchable connections, such as blinds, fireplace, or projector screens. In the present embodiment, the site controller 703 may include six relay ports 781.

The site controller 703 may include IR ports 782. The IR ports 782 may include IR in ports and IR out ports. The IR in ports may include a pluggable terminal block connector that may be used for handheld IR devices, such as non-updateable remote controllers (not shown). In the present embodiment, the site controller 703 may include four IR in ports. The IR out ports may include 3.5 mm earphone jacks. The IR out ports may be used for IR sticky emitters that can be placed over IR readers on media players, TVs, or any other device that can be controlled using IR signals to transmit the IR signal from site controller 703 to the target. In the present embodiment, the site controller 703 may include eight IR out ports. The site controller 703 may include video sense loop in/out ports 783. The video sense loop in/out ports 783 may be composite ports for video sources, such as DVD players or VCRs, which allow the site controller 703 to detect the On/Off status of devices that use the same IR code for both on and off commands. The site controller 703, in the present embodiment, may include 4 pairs of video sense loop in/out ports 783 (four in and four out).

The site controller 703 may include an Ethernet connector 784 for establishing an Ethernet connection 326 with the devices 104 in a site 101. The Ethernet connector 784 may be connected to the network interface 667 on the site controller 603. The Ethernet connector 784 may be an RJ-45 for a 10/100 BaseT Ethernet connector. In the present embodiment, the site controller 703 may include an additional USB port 778 on the back of the site controller 703. A modem port 785 may be included with the site controller 703. The modem port 785 may be an RJ-11 port for a modem to support caller ID or a voice menu system.

The site controller 703 may also include audio in/out ports 786. The audio in ports may be RCA jacks for stereo channel input for stereo analog sources. In the present embodiment, the site controller may include three audio in ports. The audio out ports may be RCA jacks for stereo channel output. In the present embodiment, the site controller 703 may include three audio out ports. The audio in/out ports 786 may include digital audio in/out ports. The digital audio in/out ports may be designed for a Toslink™ optical cable for digital audio in/out, like MP3 players, CD players, DVD players, etc.

The site controller 703 may include various video ports 787. The video ports 787 may be in/out ports and may include composite video ports, S-Video ports, component video ports, HDMI, DVI, VGA and/or any other video ports. The video ports 787 may be used to display navigation menus on a monitor or TV. In the present embodiment, the video ports 787 include a composite video out port, an S-Video out port, a component video out port, and a VGA out port. A power plug port 788 may be included in the site controller 703.

The site controller 703 is different than a personal computer for a number of reasons. The site controller 703 is an embedded system that is specialized for the functions and purposes set forth herein. The site controller 703 generally does not include a keyboard or mouse for standard operation. Unlike a personal computer, the site controller 703 may not contain an expandable motherboard. For example, the site controller 703 may not include expandable memory slots or expandable ports, such as a PCI, AGP, or PCI Express card slot. Unlike a personal computer, the site controller 703 may also not have an exclusive computer monitor. For example, typically a personal computer may include a relatively large monitor or display that is primarily for viewing an operating system user interface and executed programs, while the site controller 703 may merely use a television or monitor for brief periods of time while the television or monitor may primarily be used for viewing television programming, DVDs, etc. In another example, the site controller 703 may be used without a separate monitor; the site controller 703 may use the display area 772. Typically, a personal computer with such a small display area would be incapable of the multiple interfaces and ports that may be found on a site controller 703. The site controller 703 may also not have the capability to install and run third party software, such as word processing software. The site controller 703 typically does not allow a user to install and run third party software on the controller 703. Unlike a personal computer, a typical user generally could not install a different operating system on the site controller 703.

Figure 8:
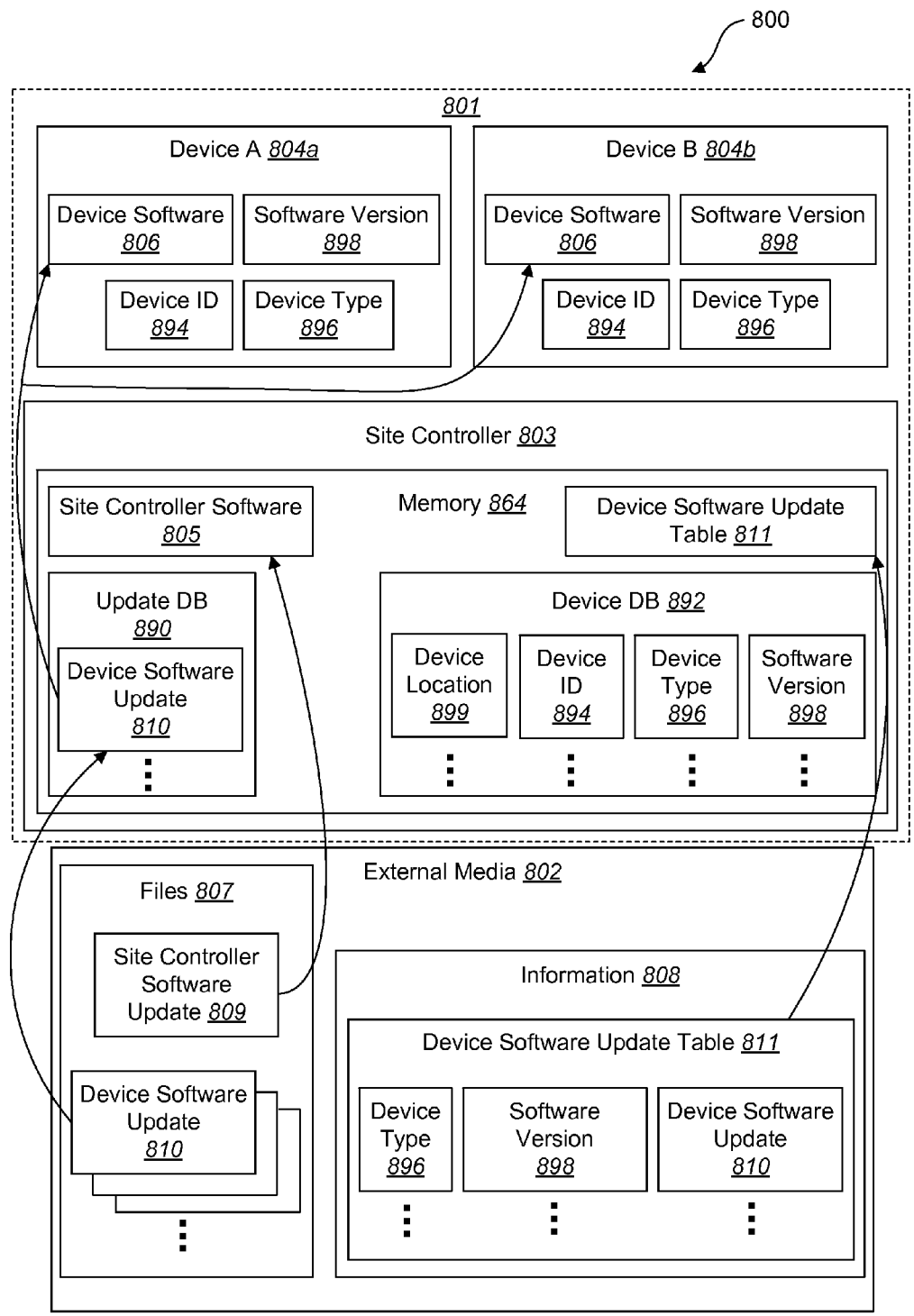
FIG. 8 is a functional block diagram illustrating a further embodiment of a system for updating a site.

FIG. 8 is a functional block diagram illustrating a further embodiment of a system 800 for updating a site 801. The system 800 may include external media 802, a site controller 803, a Device_A 804a, and a Device_B 804b.

The external media 802 may take the form of memory cards such as the CompactFlash, SmartMedia, Memory Stick, Secure Digital, MultiMedia card, or xD-Picture Card formats; a CD-ROM, DVD-ROM, floppy disks, or external hard drive; or a USB flash drive. The external media 802 may include files 807 and information 808.

The files 807 may include a site controller software update 809 and various device software updates 810. The site controller software update 809 may update the site controller software 805 on the site controller 803. The site controller software update 809 may contain the necessary software to update the site controller software 805 on the site controller 803 and to update the device software 806 on the various devices 804 connected to the site controller 803.

The site controller software update 809 may be a firmware update, a software update, or other update for the site controller 803. The site controller software update 809 may include bug fixes, operating system updates, menu changes, new database relationships, new communication protocols, and/or usability or performance improvements. The site controller software update 809 may replace the site controller software 805 entirely, or may simply be a patch to the existing software 805.

The device software updates 810 on the external media 802 may be stored on the site controller 803. In the present embodiment, the device software updates 810 may be stored in an update database (DB) 890. The update DB 890 may be included in the memory 864 of the site controller 803. The update DB 890 may include the device software updates 810 for various devices 804 that may be connected to the site controller 803.

The information 808 stored on the external media 802 may include any information necessary to update a site 801. The information 808 may include a device software update table 811. The device software update table 811 may be a table that contains the information necessary to update the site 801. The device software update table 811 may include device information such as device types 896, software versions 898, and device software updates 810. The device software update table 811 may also include the dependencies between the software modules. The device software update table 811 may also include the order of installing the device software updates 810. In the present embodiment, each device software update 810 may be linked to a particular device type 896 and software version 898. In other embodiments, the device software updates 810 may be linked to other criteria, such as the time since the last update on a particular device 804. The device software update table 811 may be stored on the site controller 803.

The site controller 803 may include memory 864. The memory 864 may include the site controller software 805, the update DB 890, the device software update table 811, and a device DB 892.

The device DB 892 may include information regarding devices 804 registered with the site controller 803. The registration of devices 804 is discussed in more detail in connection with FIG. 11. The device DB 892 may include device locations 899, device identifications (IDs) 894, device types 896, and software versions 898 for the devices 804 registered on the site controller 803.

The software version 898 may indicate the update version of the device software 806 on a particular device 804. For example, if a device 804 has been updated to version 2.2, the software version 898 would indicate this.

The device ID 894 may be device specific, such that it is unique to the devices 804 registered with the site controller 803. The device ID 894 may be an identification that was associated with the device upon manufacture. The device ID 894 may be an identification that is designated by a user or an installer. The device type 896 may indicate what type of device the device 804 is; for example, whether the device is a contact relay extender 335 or a switch/dimmer 333. The device location 899 may indicate the physical location of the device 804; for example, in the living room 442, dining room 443, kitchen 444, den 445, or patio 446.

The site controller software 805 may be used to interface with the various connected devices 804. The system 800 may include multiple devices 804. The devices 804 may include their respective device software 806, software version 898, device ID 894, and device type 896. The device software 806 may be used to interface with the site controller 803 and any connected devices. For example, if Device_A 804a were connected to a fireplace 557 (shown in FIG. 5), the device software 806 would enable Device_A 804a to send and receive data from the site controller 803 and to process the data, such as turning the fireplace 557 on or off based on the received data. The device software 806 may also be used to receive device software updates 810 from the site controller 803.

Figure 9:
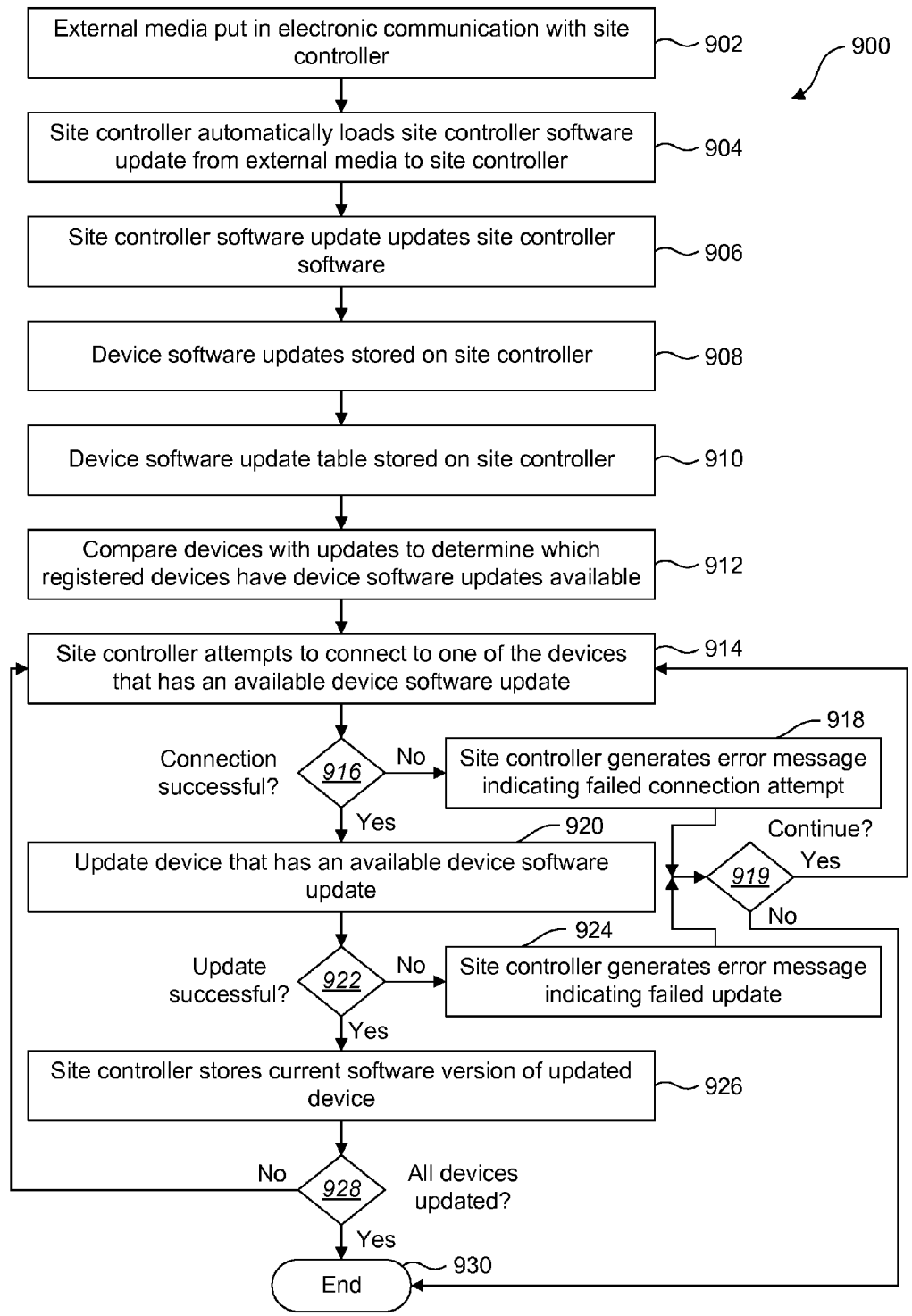
FIG. 9 is a flow diagram of an embodiment of a method for updating a site.

FIG. 9 is a flow diagram of an embodiment of a method 900 for updating a site 101. The external media 102 is put 902 in electronic communication with the site controller 103. The external media 102 may be put 902 in electronic communication with the site controller 103 by placing a CD or DVD in the CD-RW drive 666, by connecting a memory card or USB flash drive to the site controller 103 via a communications port 670, or some other process. After the user puts 902 the external media 102 in electronic communication with the site controller 103, the site controller 103 may automatically perform the remaining actions to update the site 101. Automatically performing the remaining actions may mean that there is no further user interaction with the site controller 103. For example, after the external media 102 is put 902 in electronic communication with the site controller 103, the user may not be able to access the site controller 103 or devices 104 at the site 101 until all updates are complete. In another example, after the external media 102 is put 902 in electronic communication with the site controller 103, the user may only be able to access the site controller 103 and the devices 104 at the site 101 that have been updated, but may not be able to access devices 104 that have not been updated.

The site controller 103 may automatically load 904 the site controller software update 109 from the external media 102 onto the site controller 103. In the present embodiment, there may not be any user interaction with the site controller 103 or any device 104 connected to the site controller 103 other than putting 902 the external media 102 in electronic communication with the site controller 103.

In some embodiments, there may be some user interaction with the site controller 103, but in most embodiments, there is no interaction with the devices 104 connected to the site controller 103. In most embodiments, most devices 104 are not capable of being put 902 in electronic communication with the external media 102; i.e. the connected devices 104 may not have a CD-RW drive 666 or communications ports 670. Most devices 104 may not include a user interface for allowing a user to directly update the device 104. For example, though a switch/dimmer 333 may be capable of transmitting and receiving data via a ZigBee connection 328, in the present embodiment, the switch/dimmer 333 does not have any communication ports 670 or any other way of electronic communication with the external media 102.

Automatically loading 904 the site controller software update 809 from the external media 102, in the present embodiment, may include copying the site controller software update 809 from the files 107 on the external media 102 to the memory 664 of the site controller 103. Automatically loading 904 the site controller software update 109 from the external media 102 may include updating the firmware on the site controller 103. Automatically loading 904 the site controller software update 109 from the external media 102 may include any process used to automatically load 904 an update on a computing or embedded device.

The site controller software update 109 may update 906 the site controller software 105. Updating 906 the site controller software 105 may include patching, replacing, or upgrading the site controller software 105. The device software updates 110 may be stored 908 on the site controller 103. The device software updates 110 may be stored 908 in the memory 664 of the site controller 103. The device software updates 110 may be stored 908 in the update DB 890 on the site controller 103.

The device software update table 111 may be stored 910 on site controller 103. The site controller software 105 may be the mechanism for storing 910 the device software update table 111 on the site controller 103. The device software update table 111 may be stored 910 in the device software update table 111 on site controller 103. Storing 910 the device software update table 111 from the external media 102 on the site controller 103 may include replacing the device software update table 111 on the site controller 103 with the device software update table 111 from the external media. In the present embodiment, storing 910 the device software update table 111 from the external media 102 on the site controller 103 may include appending data not stored on the device software update table 111 on the site controller 103 with the new data from the device software update table 111 on the external media 102.

The devices 104 may be compared 912 with the available device software updates 110 to determine which devices 104 have a device software update 110 available. The site controller software 105 may perform the comparison 912. The software version 898 of the device software 106 on the devices 104 may be compared 912 with the software version 898 of the device software updates 110. For example, the software version 898 of the device software 106 may be compared 912 with the device software updates 110 in the device software update table 111 to determine if an update is available. In the present embodiment, the software version 898 of the devices 104 and the device type 896 may be compared 912 with the device software updates 110 and device type 896 in the device software update table 111 to determine if an update is available.

For example, Device_A 804a may be a speaker point 339 with a device ID 894 of speaker-point-000fff00ab12 and with device software 106 that has a software version 898 of 2.2. The site controller software 105 may look up the available device software updates 110 in the update DB 890 on the site controller 103 and compare the device software updates 110 with the information stored in the device software update table 111. The device software updates 110 may be available to update any previous software version 898 to software version 2.3. The device software update table 111 may indicate that device software updates 110 to software version 2.3 are available for thermostats 332, switch/dimmers 333, LCD keypads 337, and speaker points 339. Because Device_A 804a is a speaker point 339 with a software version 898 of 2.2, the site controller software 805 would determine that a device software update 110 was available for Device_A 804a.

The site controller 103 may attempt 914 to connect to one of the devices 104 that has an available device software update 810. The site controller 103 may attempt 914 to connect to one of the devices 104 using any network connection, such as an Ethernet, WiFi, or ZigBee connection 326, 327, 328. In some embodiments, the site controller 103 may only attempt 914 to connect to registered devices 104. The site controller 103 may choose to which device to attempt 914 to connect based on the information stored in the device DB 892.

The site controller 103 may determine 916 whether the attempt 914 to connect to a device 104 was successful. The site controller 103 may determine 916 whether the attempt 914 to connect to a device 104 was successful by pinging a device 104 and waiting for a response or any other process for determining whether a device 104 is connected.

If the site controller 103 determines 916 the attempt 914 to connect to a device 104 was unsuccessful, the site controller 103 may generate 918 an error message that indicates that the attempt 914 to connect to the device 104 failed. The error message may indicate the device ID 894 of the device 104 with which the attempt 914 to connect failed, the connection types attempted (i.e. an Ethernet connection 326, a WiFi connection 327, a ZigBee connection 328, etc.), or any other information necessary to troubleshoot a connection. In some embodiments, the site controller 103 may not generate 918 an error message, but rather may continue to attempt 914 to connect to the device 104 until the connection is successful. In other embodiments, the site controller 103 may generate 918 an error message and, after updating 920 the remaining devices 104, attempt 914 to connect to the device 104 until the connection is successful. After an error message is generated 918, 924, the site controller 103 may determine 919 whether to continue with or to stop 930 the site update.

If the site controller 103 determines 916 the attempt 914 to connect to a device 104 was successful, the site controller 103 may update 920 the device 104 to which the site controller 103 is connected. Updating 920 the device 104 may include updating the device software 106 on the device 104 with the device software update 110 from the site controller 103. For example, the site controller software 105 may push the device software update 110 from the site controller 103 to the device software 106 on the device 104, or may update 920 the device software 106 using any other updating process.

Updating 920 the device 104 may include updating another device 104 in the site 101 that is capable of further updating any connected devices 104. For example, the site controller software 105 may update a device 104, such as a second site controller 103 in the site 101, which is also capable of storing device software updates 110 and updating 920 other devices 104. Furthermore, updating 920 the device 104 may include transmitting the device software updates 110 over a network connection such as an Ethernet connection 326, a WiFi connection 327, a ZigBee connection 328, or any other wired or wireless connection.

The site controller 703 may also be capable of managing a staged update. For example, the site controller 703 may be able to first update 920 a device 104 from a software version 898 of 1.0 to a software version 898 of 1.5, second update 920 the device 104 from the software version 898 of 1.5 to a software version 898 of 2.2, and then update 920 the device 104 from the software version 898 of 2.2 to a software version 898 of 2.3. This may be useful if the device software 106 is not capable of being directly updated from an early version to a later version.

The site controller 103 may determine 922 whether updating 920 the device 104 was successful. The site controller 103 may determine 922 whether updating 920 the device 104 was successful by checking the software version 898 of the device software 106 after updating 920 the device. For example, updating 920 the device 104 may include the final step of storing the new software version 898 in the device DB 892 on the site controller 103. In this example, the site controller 103 may check the device DB 892 to determine that that updated device 104 now has the proper software version 898.

The site controller 103 may determine 922 whether updating 920 the device 104 was successful by performing various tests on the device software 106. If the site controller 103 determines 922 that the device 104 was not successfully updated 920, the site controller 103 may generate 924 an error message that indicates that the update 920 failed. The error message may indicate the device ID 894 of the device 104 that was not successfully updated 920, any software specific error code, or any other information necessary to troubleshoot the failed update 920. In some embodiments, the site controller 103 may not generate 924 an error message, but rather may continue to attempt to update 920 the device 104 until the update is successful. In other embodiments, the site controller 103 may generate 924 an error message and, after updating 920 the remaining devices 104, attempt to update 920 the device 104 until the update 920 is successful. After an error message is generated 918, 924, the site controller 103 may determine 919 whether to continue with or to stop 930 the site update.

Error messages may be indicated on the site controller 103. For example, an error message may be displayed on the display area 772 on the site controller 103, may play an audio indicator, or may simply be stored in the memory 664 of the site controller 103 for later access.

If the site controller 103 determines 922 that the device 104 was successfully updated 920, the site controller 103 may store 926 the current software version 898 of the device 104 that was updated 920. The site controller 103 may store 926 the current software version 898 of the device 104 that was updated 920 in the device DB 892.

The site controller 103 may determine 928 whether any additional devices 104 need to be updated 920. The site controller 103 may determine 928 whether any additional devices 104 need to be updated 920 by checking the device DB 892 to determine whether an update was already attempted. In another example, the device DB 892 may include data indicating whether an update 920 was attempted on a device 104, such that the site controller 103, after attempting an update 920, adds this data to the device DB.

If the site controller 103 determines 928 that additional devices 104 need to be updated 920, the site controller 103 may attempt 914 to connect another device 104. If the site controller 103 determines 928 that no additional devices 104 need to be updated 920, the site controller 103 may end 930 the update attempt.

In some embodiments, the site controller 103 may require that all devices 104 registered in the site 101 must have the same software version 898 of the device software 806. In other embodiments, only device software updates 110 that add functionality to the devices 104 are installed. For example, if a device software update 110 is not available for a device type 896, the site controller 103 may simply change the software version 898 of the device in the device DB 892 to the latest software version 898.

Figure 10:
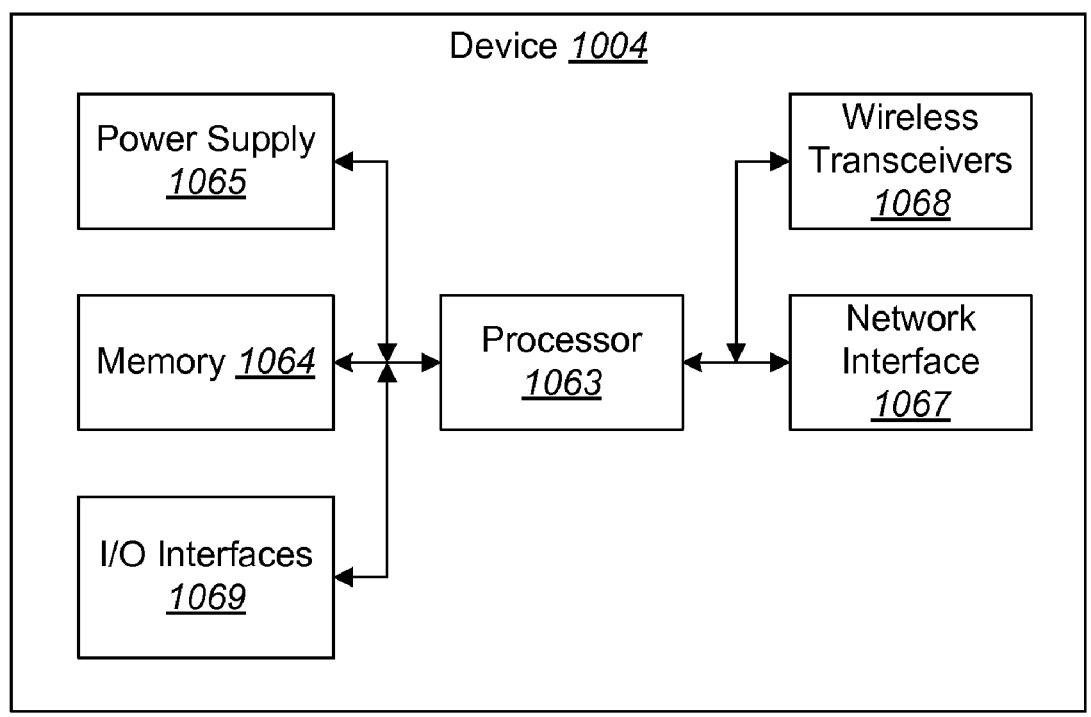
FIG. 10 is a block diagram illustrating various hardware components that may be used in an embodiment of a device that may be updated during a site update.

FIG. 10 is a block diagram illustrating various hardware components that may be used in an embodiment of a device 1004 that may be updated at a site 101. The devices 1004 may include a processor 1063 that is in electronic communication with memory 1064. The memory 1064 may include volatile and/or non-volatile memory. The devices 1004 may include a power supply 1065. In most embodiments, the devices 1004 do not include a CD-RW drive 666.

The devices 1004 may include a network interface 1067 that allows the devices 1004 to connect to wired connections, such as Ethernet connections 326. The network interface 1067 may use various protocols to enable the devices 1004 to interface with any wired network. In most embodiments, the devices 1004 do not include communication ports 670.

The devices 1004 may include wireless transceivers 1068. The devices 1004 may include a WiFi transceiver and/or a ZigBee transceiver. The devices 1004 may include any type of wireless transceiver 1068. For example, the wireless transceiver 1068 may allow the site controller 103 to transmit and receive data using any wireless protocol, such as WiFi, ZigBee, Bluetooth, Ultra Wideband, Wimax, or cellular protocols, such as GSM or EVDO.

The devices 1004 may include I/O interfaces 1069. For example, the I/O interfaces 1069 may include inputs and/or outputs such as contacts and relays.

Figure 11:
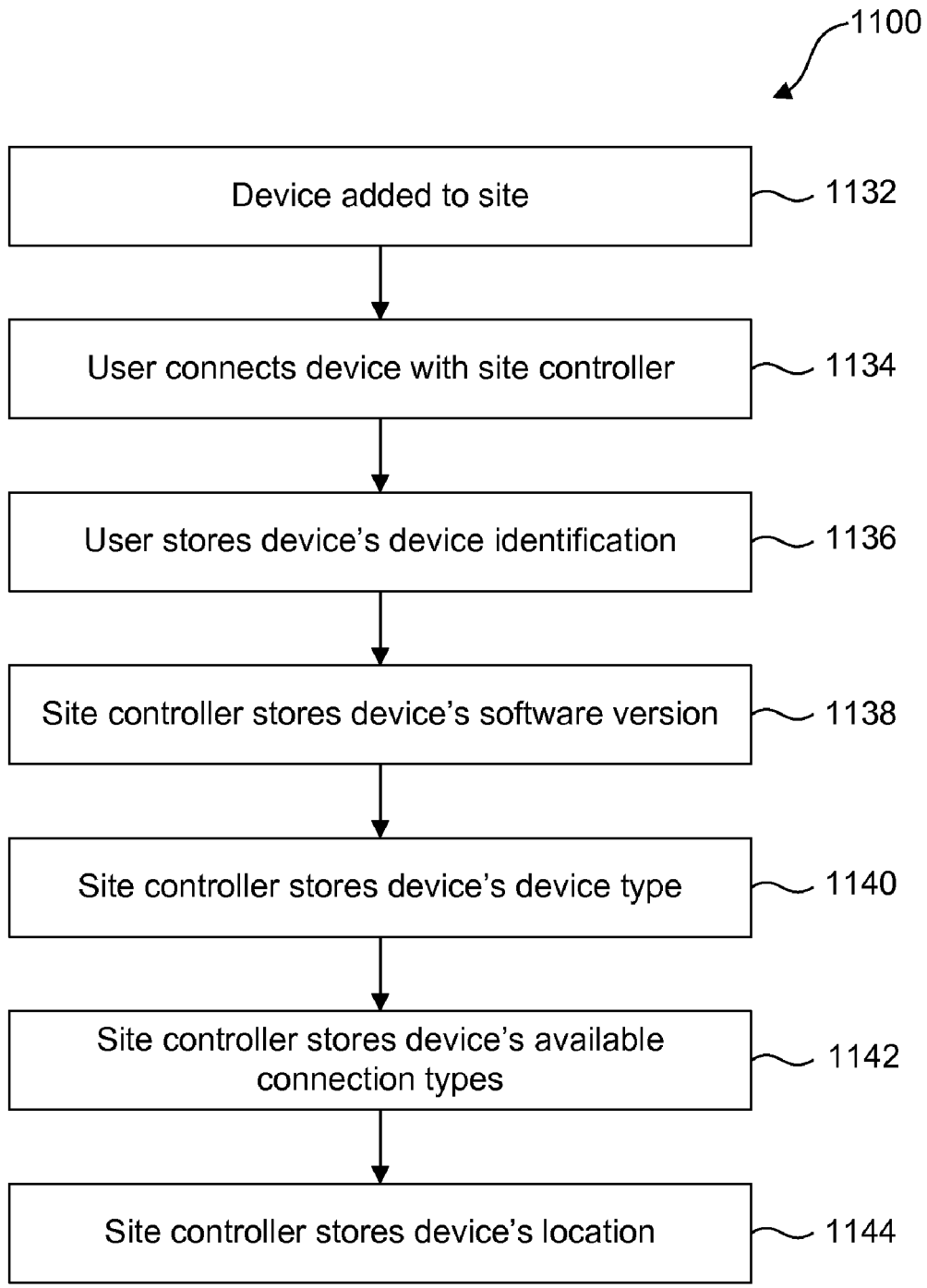
FIG. 11 is a flow diagram of an embodiment of a method for registering embedded devices at a site.

FIG. 11 is a flow diagram of an embodiment of a method 1100 for registering devices 104 at a site 101. A device 104 may be added 1132 to the site 101. For example, a switch/dimmer 333 may be installed in a home or a thermostat 332 may be installed in an office building. For devices 104 that are capable of communication over an Ethernet connection 326, adding 1132 a device 104 to a site 101 may include connecting the device 104 over an Ethernet connection 326. The user may connect 1134 the device 104 with the site controller 103. Connecting 1134 the device 104 with the site controller 103 may include turning on the device 104 to enable wired or wireless communication with the site controller 103.

The user may store 1136 the device ID 894 for the device 104 on the site controller 103 by accessing the site controller 103. For example, the device ID 894 may be stored in the device DB 892 on the site controller 103. The site controller 103 may store 1138 the software version 898 of the device software 106 on the site controller 103. The site controller 103 may store 1140 the device type 896 for the device 104 on the site controller 103 (e.g., in the device DB 892 on the site controller 103). The site controller 103 may store 1142 the connection types available for the device 104 on the site controller 103. For example, if the device 104 is capable only of an Ethernet connection 326 and a ZigBee connection 328, this may be stored 1142 on the site controller 103. The site controller 103 may store 1144 the location 899 of the device 104 on the site controller 103. For example, the device location 899 may indicate if the device 104 is located in the living room 442, dining room 443, kitchen 444, den 445, on the patio 446, etc. The device ID 894, software version 898, device type 896, available connection types, and device location 899 may be stored in the device DB 892 on the site controller 103. In other embodiments, the user may store 1136, 1138, 1140, 1142, 1144 the device ID 894, software version 898, device type 896, available connection types, and device location 899 on the site controller 103. The information may be stored 1136, 1138, 1140, 1142, 1144 by the user or the site controller 103. In the present embodiment, the user may only store 1136 the device ID 894 for the device 104 on the site controller 103 and the site controller 103 may automatically store 1138, 1140, 1142, 1144 the remaining information.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for updating a site, comprising:
providing a site controller having site controller software;
providing a plurality of devices that are not directly user updatable and are not connected to the Internet, wherein the plurality of devices are in electronic communication with the site controller;
putting external media, including device software updates and site controller software updates, in electronic communication with the site controller, wherein the external media is put into electronic communication with the site controller by a user;
automatically updating the site controller software with the site controller software updates;
automatically determining which devices of the plurality of devices need to be updated;
automatically updating the devices needing an update by communicating at least a portion of the device software update to the devices needing an update, wherein the site controller software is updated before the devices are updated;
preventing user access to the site controller and the devices once the user puts the external media in electronic communication with the site controller until the devices have been updated and the site controller software has been updated; and
automatically storing the device software updates on the site controller from the external media if the devices were successfully updated.

2. The method of claim 1, further comprising automatically storing a current software version of a first device.

3. The method of claim 1, wherein automatically determining does not require any user interaction at the site controller.

4. The method of claim 1, wherein the site controller does not require a keyboard or a mouse for standard operation.

5. The method of claim 4, wherein the site controller comprises an embedded system that includes built-in audio ports, built-in video ports, and built-in infrared in and out ports.

6. The method of claim 1, wherein the site controller does not require an external exclusive computer monitor for standard operation.

7. The method of claim 1, wherein the site controller is not connected to the Internet.

8. A computer system that is configured to update a site with a site controller, the computer system comprising:
a plurality of devices that are not directly user updatable and are not connected to the Internet, wherein the plurality of devices are in electronic communication with the site controller;
external media, including device software updates and site controller software updates, in electronic communication with the site controller, wherein the external media is put into electronic communication with the site controller by a user;
the site controller comprising:
a processor;
memory in electronic communication with the processor;
site controller software stored in the memory;
instructions stored in the memory, the instructions being executable to:
automatically determine which devices of the plurality of devices need to be updated;
automatically update the site controller software with the site controller software updates;
automatically update the devices needing an update by communicating at least a portion of the device software update to the devices needing an update, wherein the site controller software is updated before the devices are updated;
prevent user access to the site controller and the devices once the user puts the external media in electronic communication with the site controller until the devices have been updated and the site controller software has been updated; and
automatically store the device software updates on the site controller from the external media if the devices were successfully updated.

9. The instructions of claim 8, further executable to automatically store the current software version of a first device.

10. The instructions of claim 9, wherein automatically determining does not require any user interaction at the site controller.

11. The system of claim 10, wherein the site controller does not require a keyboard or a mouse for standard operation.

12. The system of claim 11, wherein the site controller comprises an embedded system that includes built-in audio ports, built-in video ports, and built-in infrared in and out ports.

13. The system of claim 12, wherein the site controller does not require an external exclusive computer monitor for standard operation.

14. The system of claim 13, wherein the site controller is not connected to the Internet.

15. A non-transitory computer-readable storage medium for updating a site, wherein the site includes a site controller having site controller software, wherein the site further comprises a plurality of devices in electronic communication with the site controller that are not directly user updatable and are not connected to the Internet, and external media in electronic communication with the site controller that include device software updates and site controller software updates, wherein the external media is put into electronic communication with the site controller by a user, the computer readable medium comprising instructions for:

automatically determining which devices of the plurality of devices need to be updated;

automatically updating site controller software with the site controller software updates;

automatically updating the devices needing an update by communicating at least a portion of the device software update to the devices needing an update, wherein the site controller software is updated before the devices are updated;

preventing user access to the site controller and the devices once the user puts the external media in electronic communication with the site controller until the devices have been updated and the site controller software has been updated; and automatically storing the device software updates on the site controller from the external media if the devices were successfully updated.

16. The non-transitory computer-readable storage medium of claim 15, wherein the computer-readable medium comprises further instructions for automatically storing the current software version of a first device.

17. The non-transitory computer-readable storage medium of claim 15, wherein automatically determining does not require any user interaction at the site controller.

18. The non-transitory computer-readable storage medium of claim 15, wherein the site controller does not require a keyboard or a mouse for standard operation.

19. The non-transitory computer-readable storage medium of claim 16, wherein the site controller comprises an embedded system that includes built-in audio ports, built-in video ports, and built-in infrared in and out ports.

20. The non-transitory computer-readable storage medium of claim 16, wherein the site controller does not require an external exclusive computer monitor for standard operation.

21. The method of claim 1, wherein the plurality of devices do not have any communication ports for putting the external media in communication with the devices, and wherein the plurality of devices are not connectable to a network outside of the control of the site controller.

22. The method of claim 1, wherein the site controller comprises a device update table that stores which versions of the updates have previously been installed on the devices and also indicates any necessary order of installing the updates, wherein the update table also indicates the device type and any dependencies between software modules.

23. The method of claim 1, wherein the site controller does not allow installation of third-party software.

24. The method of claim 22, wherein the site controller includes a device database that identifies the location of each device, a device identification for each device, and the software versions for each device, wherein the location indicates the physical location of the device.

25. The method of claim 24, wherein the site controller only attempts to update the devices that have been previously registered with the site controller.

26. The method of claim 25, wherein the plurality of devices include an outlet switch/dimmer.

27. The method of claim 26, wherein the site controller communicates with the outlet switch/dimmer via a Zigbee connection.

* * * * *